United States Patent
Zanotti (10) Patent No.: US 9,414,573 B2
(45) Date of Patent: Aug. 16, 2016

(54) METHOD FOR TRANSPORTING LIVE POULTRY ON BOARD A TRUCK

(75) Inventor: Massimo Zanotti, Gussago (IT)

(73) Assignees: Massimo Zanotti, Gussago (IT); GIORDANO POULTRY PLAST S.P.A, Caraglio (Cuneo) (IT)

( * ) Notice: Subject to any disclaimer, the term of this patent is extended or adjusted under 35 U.S.C. 154(b) by 1068 days.

(21) Appl. No.: 13/384,979

(22) PCT Filed: Jul. 20, 2009

(86) PCT No.: PCT/IT2009/000321
§ 371 (c)(1),
(2), (4) Date: Apr. 20, 2012

(87) PCT Pub. No.: WO2011/010329
PCT Pub. Date: Jan. 27, 2011

(65) Prior Publication Data
US 2012/0192800 A1  Aug. 2, 2012
US 2013/0032095 A2  Feb. 7, 2013

(51) Int. Cl.
*A01K 31/07* (2006.01)
*B65D 21/02* (2006.01)
*A01K 31/00* (2006.01)
*A01K 45/00* (2006.01)

(52) U.S. Cl.
CPC .............. *A01K 31/002* (2013.01); *A01K 45/005* (2013.01); *B65D 2577/043* (2013.01)

(58) Field of Classification Search
CPC ..... A01K 31/22; A01K 31/18; A01K 31/002; A01K 45/005; A01K 31/16
USPC ......... 119/487–494, 452, 453, 455, 459, 461, 119/462, 463; 312/330.1, 213, 312/265.1–265.4; 220/23.88, 23.87, 23.86, 220/23.83; 206/386

See application file for complete search history.

(56) References Cited

U.S. PATENT DOCUMENTS

| | | | | |
|---|---|---|---|---|
| 3,895,727 A | * | 7/1975 | Rucker | 119/488 |
| 4,084,714 A | * | 4/1978 | Williams | 119/489 |
| 4,273,071 A | * | 6/1981 | Clark et al. | 119/453 |

(Continued)

FOREIGN PATENT DOCUMENTS

| CA | 2 625 636 | 9/2008 |
|---|---|---|
| DE | 8806482 | 9/1988 |

(Continued)

OTHER PUBLICATIONS

International Search Report and Written Opinion of the International Searching Authority for corresponding International Application No. PCT/IT2009/000321, completed on dated Mar. 22, 2010, and mailed on Mar. 30, 2010.

(Continued)

*Primary Examiner* — Marc Burgess
(74) *Attorney, Agent, or Firm* — Smith, Gambrell & Russell, LLP (57) ABSTRACT

A transporting unit for live poultry on board a truck includes a supporting frame and a plurality of drawer-type cages having a lateral wall without aeration openings and intended to be selectively positioned at one side or the opposite side of the supporting frame, depending on the climatic and environmental transport conditions. The drawer-type cages are arranged in a single pile or in two adjacent piles, and in both cases the arrangement is such to be able to occupy the entire width of the loading deck of a truck.

11 Claims, 5 Drawing Sheets

(56) References Cited

U.S. PATENT DOCUMENTS

| | | | |
|---|---|---|---|
| 4,285,299 A * | 8/1981 | Thomas | 119/453 |
| 4,365,591 A | 12/1982 | Wills et al. | |
| 4,998,967 A * | 3/1991 | Box | 119/489 |
| 5,533,466 A * | 7/1996 | Kohus et al. | 119/459 |
| 5,596,950 A * | 1/1997 | Briggs et al. | 119/489 |
| 5,913,286 A | 6/1999 | Showalter | |
| 6,338,316 B1 | 1/2002 | Weaver | |
| 6,851,389 B2 * | 2/2005 | Giordano et al. | 119/453 |
| 7,389,745 B2 | 6/2008 | Weaver | |
| 2003/0136350 A1 | 7/2003 | Giordano et al. | |
| 2007/0227460 A1 | 10/2007 | Lynch | |
| 2008/0236508 A1 * | 10/2008 | Seay | 119/453 |

FOREIGN PATENT DOCUMENTS

| | | |
|---|---|---|
| EP | 0 867 113 A2 | 9/1996 |
| EP | 0 867 113 B1 | 5/2002 |
| EP | 1 330 962 A2 | 7/2003 |
| EP | 1 330 962 A3 | 1/2004 |
| EP | 1 330 952 B1 | 8/2005 |
| FR | 2 750 567 | 1/1998 |
| GB | 2 129 672 | 5/1984 |
| GB | 2 320 407 | 6/1998 |
| KR | 2011-0060085 | 6/2011 |
| NL | 9000922 | 11/1991 |

OTHER PUBLICATIONS

PCT Written Opinion of the International Searching Authority (Form/ISA/237) for PCT/IT2009/000321 issued Jan. 20, 2012 (in English language translation).

PCT Notification Concerning Transmittal of International Preliminary Report on Patentability (Form PCT/IB/326) for PCT/IT2009/000321 mailed Feb. 2, 2012 (in English language).

PCT International Preliminary Report on Patentability (Form PCT/IB/373) for PCT/IT2009/000321 issued Jan. 24, 2012 (in English language).

* cited by examiner

METHOD FOR TRANSPORTING LIVE POULTRY ON BOARD A TRUCK

CROSS REFERENCE TO RELATED APPLICATIONS

This application is a national stage of PCT International Application No. PCT/IT2009/000321 filed on Jul. 20, 2009, and published in English on Jan. 27, 2011 as WO 2011/010329, the entire disclosure of which is incorporated herein by reference.

FIELD OF THE INVENTION

The present invention generally refers to transporting live poultry from rearing to slaughter sites.

PRIOR ART

Known from European patent EP-1330952B1 owned by the same Applicants is a system for transporting live poultry comprising a supporting frame and a plurality of drawer-type cages open at the upper part and arranged in mutually stacked condition in the framework in such a manner that the bottom of a drawer-type cage serves as the cover for the underlying drawer-type cage. The drawer-type cages have lateral walls with aeration openings for ventilating the poultry contained therein and they are extractable only towards the back side of the frame opposite to its front side at which, in use, the poultry to be transported is introduced into the drawer-type cages.

This solution allows loading the poultry in a particularly simple and practical manner, without negative influence on the subsequent unloading operations at the end of the transport operation.

SUMMARY OF THE INVENTION

The present invention represents an improvement of the invention according to document EP-1330952B1, and it has the object of efficiently adapting the transport system according to such document to the variation of climatic and environmental conditions in such a manner to reduce the stress to which the poultry is subjected during transport to the maximum.

According to the invention this object is attained by means of a transporting unit for live poultry on board a truck of the type defined above, whose distinctive characteristic lies in the fact that each of the abovementioned drawer-type cages has a lateral wall substantially without aeration openings and intended to be selectively positioned at one side (for example the front side) or the opposite side (for example the back side) of the supporting frame.

During transport, the front side of the frame is typically arranged facing a side of the truck deck, whose width is usually suitable to accommodate adjacent pairs of transporting units. The front side of the frame is thus directly exposed to the external environment, usually not sheltered or protected so as not to jeopardise the ventilation of the poultry. According to the invention, the possibility of positioning the lateral wall without aeration openings of the drawer-type cages selectively at the front side of the supporting frame or at the opposite side, allows adapting the unit to the climatic and atmospheric transport conditions in an easy and simple manner: thus, with mild or summer temperatures and good weather conditions poultry transport may occur arranging the drawers with their lateral walls without openings facing inwards the truck, so as to allow ventilation of the poultry through the openings of the opposite lateral wall facing outwards. Under low temperatures and harsh climatic conditions the arrangement shall be inverted, so as to protect the poultry against cold and bad weather. In the second case, the ventilation of the poultry shall still be guaranteed by the aeration openings of the other walls, as well as due to the vertical separation between the drawer-type cages fitted into the supporting frame.

The supporting frame may be shaped in such a manner to receive just one pile or two adjacent piles of the stacked drawer-type cages. As observable hereinafter, the arrangement and size of the cages and of the frame are such that the width of the loading deck of a transport truck, usually comprised between 2.40 and 2.55 meters, may be entirely occupied with a series of pairs of piles of adjacent drawer-type cages arranged in respective pairs of single supporting frames, or in double supporting frames.

BRIEF DESCRIPTION OF THE DRAWINGS

The invention shall now be described in detail with reference to the attached drawings, strictly provided for exemplifying and non-limiting purposes, wherein.

DETAILED DESCRIPTION OF THE INVENTION

Figure 1:
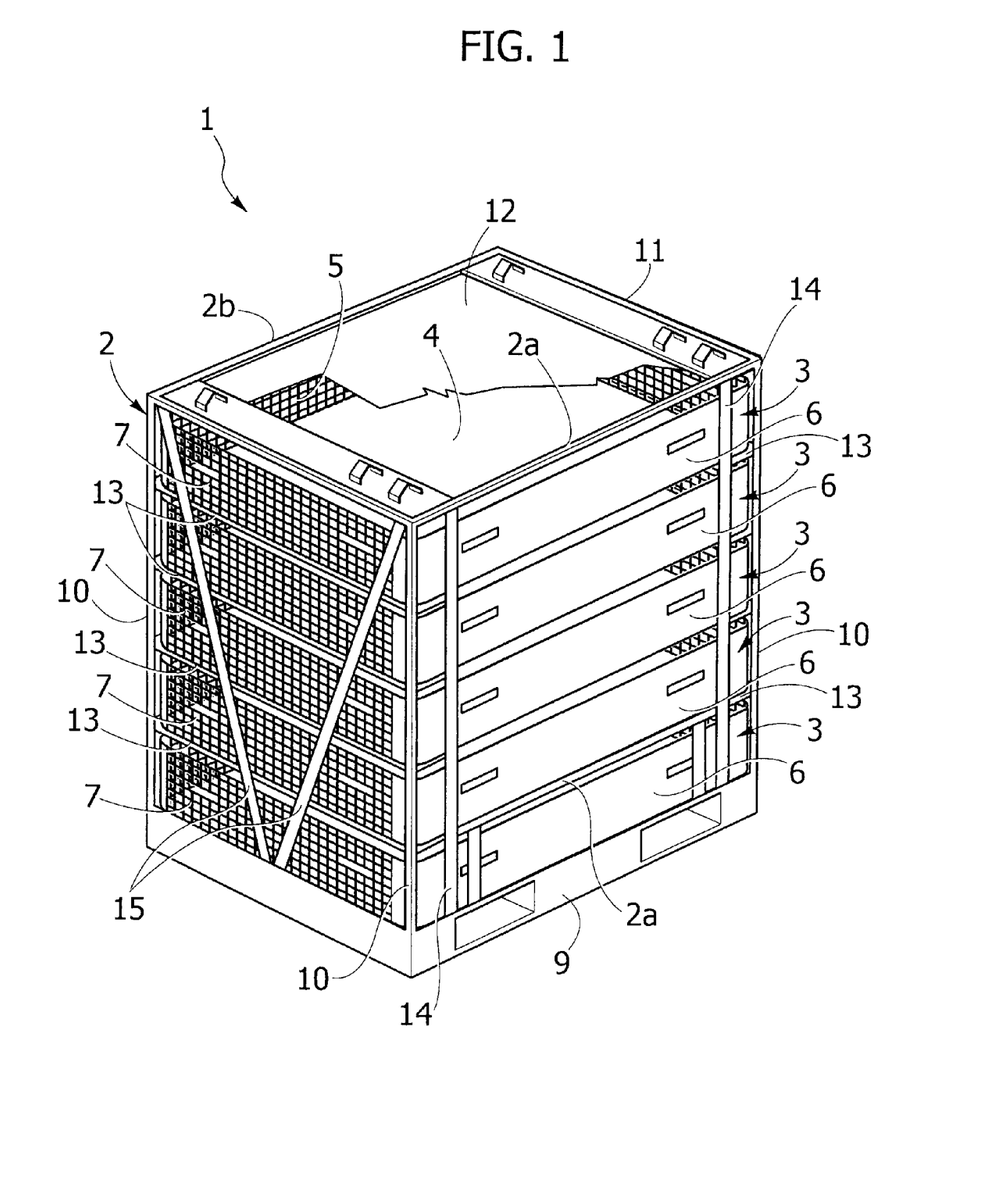
FIG. 1 is a schematic front perspective view of a transporting unit for live poultry on board a truck according to an embodiment of the invention.
Figure 2:
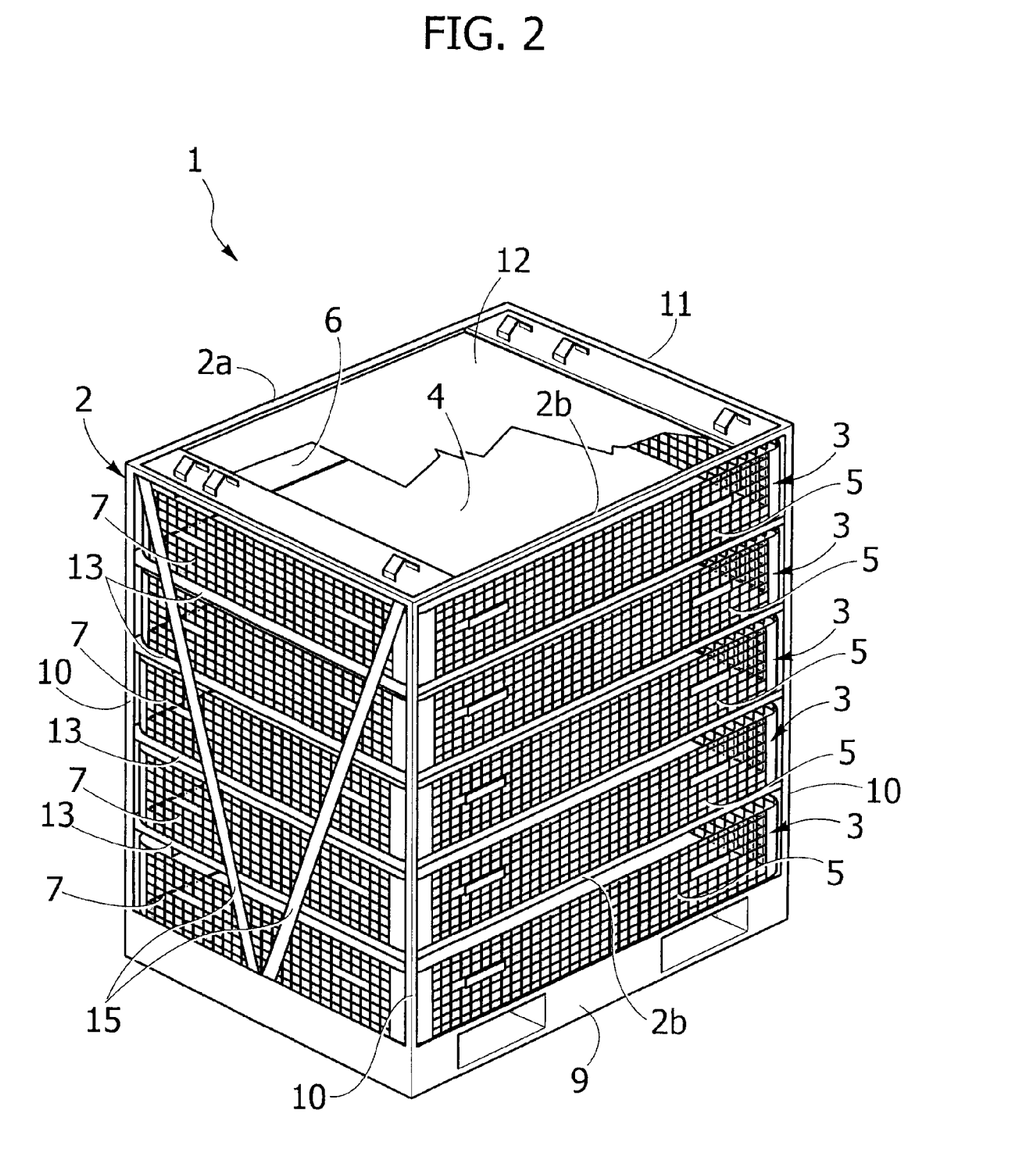
FIG. 2 is a dorsal perspective view of the unit.
Figure 3:
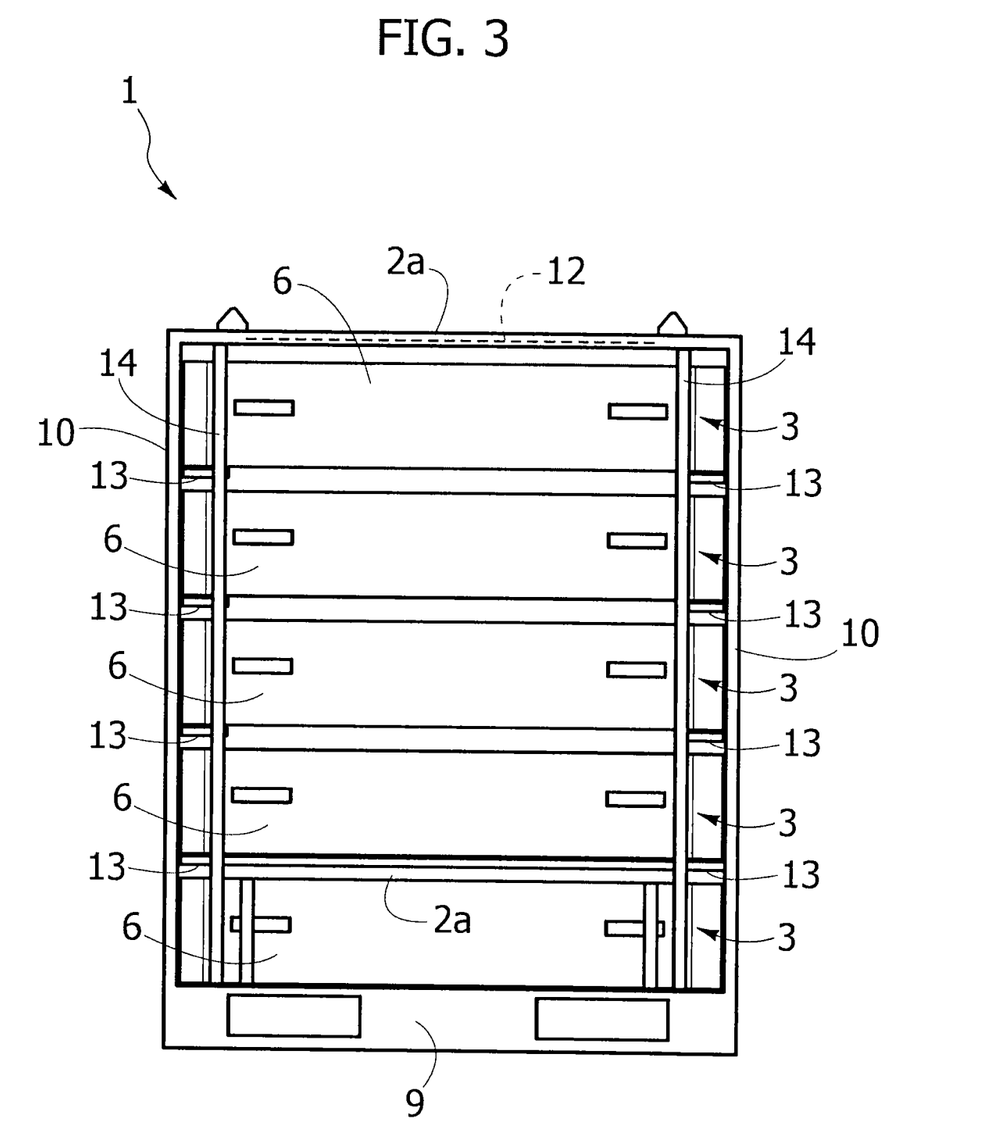
FIG. 3 is a front elevational view of FIG. 1.

Initially referring to FIGS. 1-3, reference number 1 in its entirety represents a unit or module according to the invention transporting unit for live poultry on board a truck.

Figure 5:
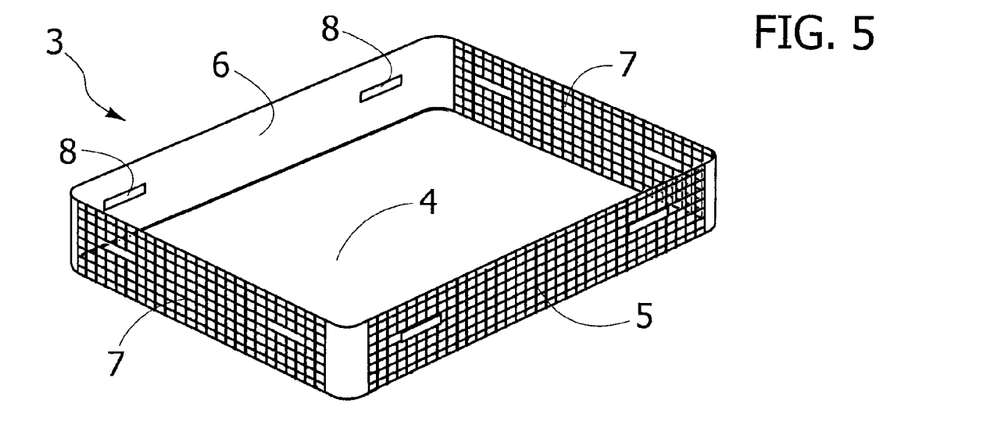
FIG. 5 is a schematic perspective view of one of the drawer-type cages of the transporting unit represented in FIGS. 1-4.

In a manner generally corresponding to the illustration and description in the aforementioned document EP-1330952B1, the unit 1 comprises a robust metal supporting frame 2 generally parallelepiped-shaped and prearranged to support a pile of stacked drawer-type cages 3 (five of them in the illustrated example), one of which is represented in detail in FIG. 5.

The supporting frame 2 may be dimensioned to receive a single pile of drawer-type cages 3, as in the case of the embodiment represented in the drawings, or two piles of adjacent drawer-type cages 3.

Each of the drawer-type cages 3 is conveniently formed by a generally parallelepiped body made of moulded plastic material with a bottom wall 4, larger lateral walls 5, 6 (about 1271 mm long) and smaller lateral walls 7 (about 1211 mm long), open at the upper part. These drawer-type cages may be conveniently analogous to those manufactured and sold by Giordano Poultry Plast S.p.A. according to patent EP-0867113B1, with a substantial difference: while the larger lateral walls 5 and the smaller lateral walls 7 are obtained with respective plurality of aeration openings, typically grid-configured, the larger lateral wall 6 is closed, in that without aeration openings. Such lateral wall 6 has a pair of spaced slits 8 useable as handles for holding the drawer-type cage 3.

Furthermore, the bottom 4 of each drawer-type cage 3 is preferably, though not necessarily, also substantially without openings.

The supporting frame 2 comprises a pallet base 9, for manipulating the unit 1 by means of fork lifts or the like, extending from which are corner uprights 10 joined at the upper part by an extractable top frame 12. Horizontally fixed to the uprights 10 are lateral guides 13 for supporting the sliding of the drawer-type cages 3, positioned in such a manner that such drawer-type cages 3 stacked in the frame 1 are separated from each other vertically, with the bottom wall 4 of each drawer-type cage 3 serving as a cover—though spaced at the upper part—of the underlying drawer-type cage 3. The upper drawer-type cage 3 is closed by the top cover 12.

According to the teaching of the aforementioned document EP-1330952 the frame 2 is also configured in such a manner to allow partial or total sliding extraction of the drawer-type cages 3 along the guide 13 only on the part of the dorsal side of the frame 2, indicated with 2b in FIG. 2 and which—to obtain such effect—is not closed. Extraction is instead hindered on the opposite side or front side, indicated with 2a in FIGS. 1 and 3, 4. For such purpose, applied along the front side 2a are additional vertical uprights 14 against which the larger lateral walls 5 or respectively 6 of the drawer-type cages 3 abut.

The sides of the supporting frame 1 may also be made rigid by means of further diagonal elements 15.

With this arrangement, loading poultry into the drawer-type cages 3 at the rearing site is obtained through the same methods described in the aforementioned EP-1330952, first partially extracting—from the dorsal side 2b of the supporting frame 2—the drawer-type cages 3 located above the lower drawer-type cage 3, for approximately half their longitudinal section. Then—from the front side 2a of the supporting frame 2, after introducing the poultry into the lowermost cage 3 until it is filled—followed by the repositioning of the immediately upper drawer-type cage 3 into the supporting frame 2, in such a manner to close the lower drawer-type cage 3. Such process is repeated until the uppermost drawer-type cage 3 is filled, then such drawer-type cage is closed by means of the top cover 12.

The unit 1 thus loaded is transferred onto the deck of a truck. The dimensions of the unit 1 are such that a normal truck deck for example allows adjacent positioning thereof two by two, with the front sides 2a of the respective supporting frames 2 facing outwards. As observable in detail hereinafter, the arrangement is such to advantageously occupy the entire width of the deck.

When unloading the poultry in the slaughter site, the drawer-type cages 3 may be entirely slidingly extracted from the dorsal side 2b of the frame 2.

Due to the previously described configuration of the drawer-type cages 3, the transporting unit 1 may be easily adapted to the climatic and environmental transport conditions, to obtain uttermost reduction of the stress the poultry is subjected to during transfer from the rearing to the slaughter site. This is obtained according to the invention by arranging the drawer-type cages 3 into the supporting frame 2 with the respective walls 6 without openings selectively at the front side 2a or at the dorsal side 2b of the frame 2. In the first case, represented in FIGS. 1 and 3 (and contrary in FIG. 2) the poultry contained in the drawer-type cages 3, with the supporting frame 2 arranged on the truck deck with its front side 2a facing outwards, is better protected in case of low temperature and/or bad weather. With such arrangement, the aeration of the poultry inside the drawer-type cages 3 is still guaranteed by the openings of the walls 5 and 7 facing inwards the truck, as well as the vertical separation between such drawer-type cages 3.

Figure 4:
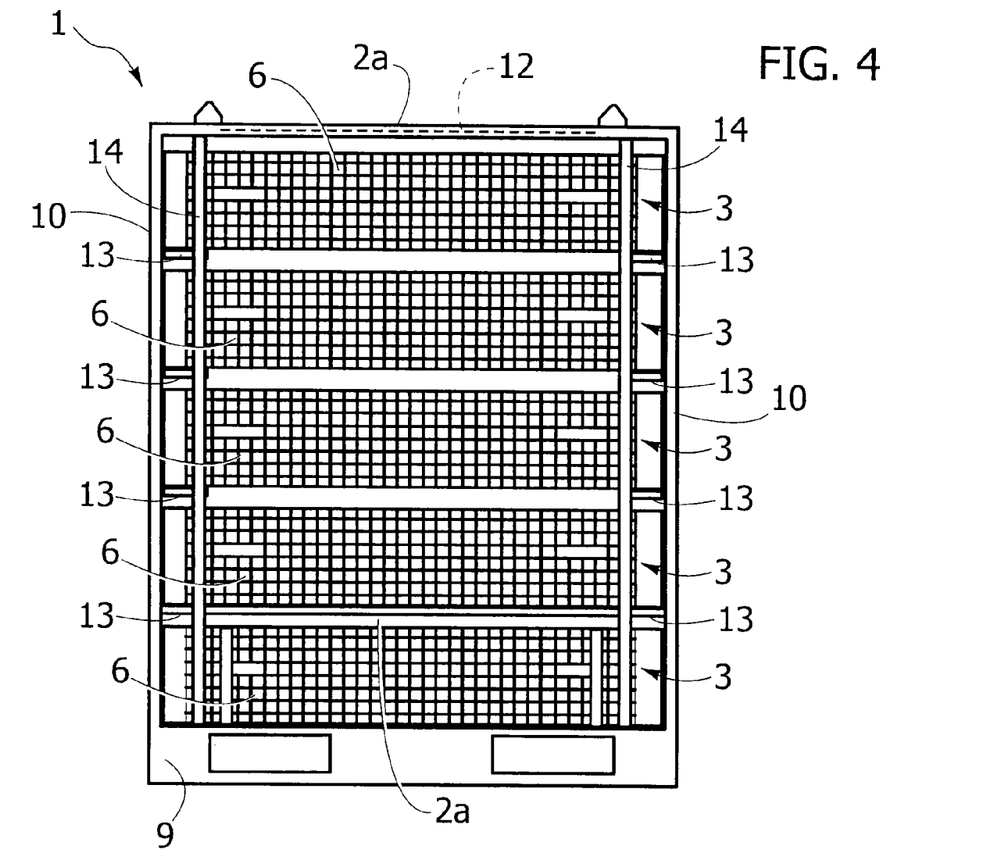
FIG. 4 is a view analogous to FIG. 3 showing a different configuration of the unit.

In the second case, represented in FIG. 4 and wherein the drawer-type cages 3 are positioned in the supporting frame 2 with the respective walls 6 without openings facing the dorsal side 2b and thus inwards the truck (i.e. with the wall 5 provided with openings facing outwards), free ventilation of the poultry contained in the drawer-type cages 3 under high temperature climatic conditions is maintained. In such case, the walls 6 without openings do not serve any purpose.

Such selective arrangement neither alters the method for loading poultry into the drawer-type cages 3 neither the method for unloading the same in any way whatsoever at the end of the transport step.

FIGS. 6A-6D exemplify the methods for positioning the transporting unit 1 according to the invention on the loading deck P of a transport truck A.

Typically the dimensions of the width of the loading deck P of the transport trucks A is comprised between 2.40 and 2.55 meters. According to the invention the unit 1 represented in the drawings has a larger horizontal dimension (corresponding to the side for loading the poultry into the drawer-type cages 3) measuring about 1350 mm and a smaller horizontal dimension measuring about 1211 mm: by arranging the units 1 two by two adjacent to each other in the direction of the smaller dimension, and with the front loading sides 2a of the respective frames 2 facing the opposite sides of the deck P of the truck A, such deck P may be entirely occupied covering its entire width. This is represented in FIGS. 6C and 6D, one with FIG. 6C corresponding to a summer environmental condition and FIG. 6D corresponding to a winter environmental condition. In the first case the drawer-type cages 3 are arranged in respective frames 2 with the closed lateral walls 6 facing inwards, while in the second case the closed lateral walls 6 face outwards. The position of the front loading sides 2a of the frame 2 of the pairs of units 1 adjacent to each other is the same in both cases.

As already observed previously, the supporting frame 2 may be prearranged to contain two adjacent piles instead of one pile of drawer-type cages 3 and also in this case the dimensions of the double unit 1 according to the invention shall be such to entirely occupy the deck P of the truck A width-wise.

Figure 6A:
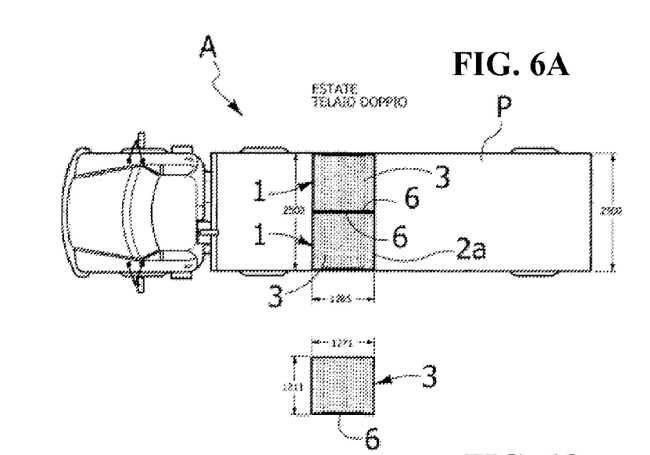
FIG. 6A is a diagram exemplifying, in top plan view, a first possible arrangement of units for transporting poultry according to the invention on board a truck.
Figure 6B:
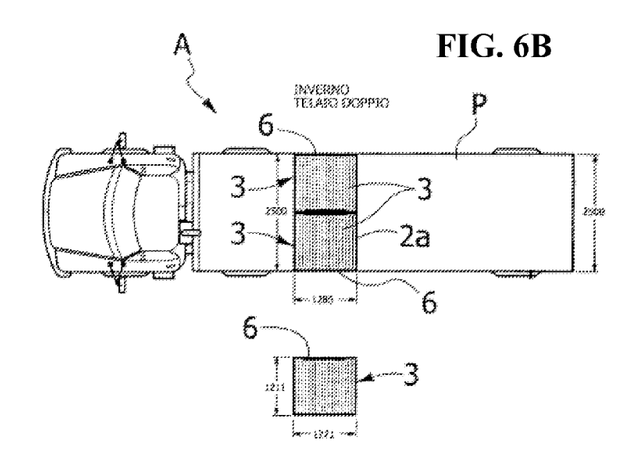
FIG. 6B is a diagram exemplifying, in top plan view, a second possible arrangement of units for transporting poultry according to the invention on board a truck.
Figure 6C:
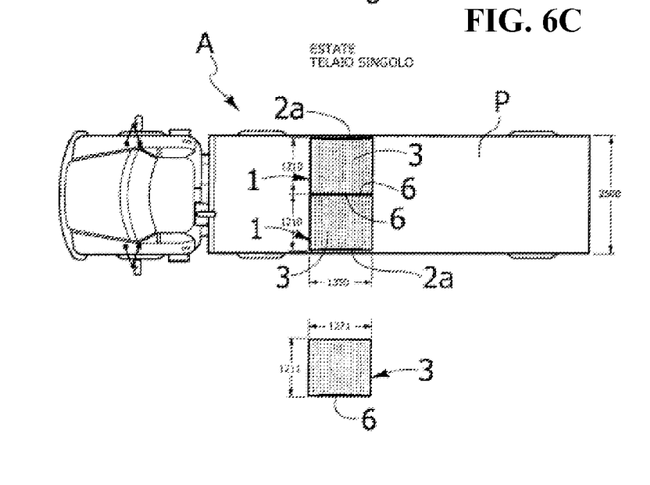
FIG. 6C is a diagram exemplifying, in top plan view, a third possible arrangement of units for transporting poultry according to the invention on board a truck.
Figure 6D:
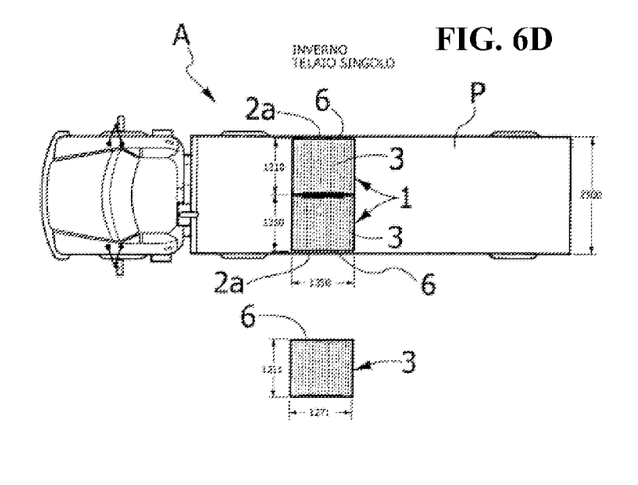
FIG. 6D is a diagram exemplifying, in top plan view, a fourth possible arrangement of units for transporting poultry according to the invention on board a truck.

Such configuration is shown in FIGS. 6A and 6B, with FIG. 6A corresponding to a summer environmental condition and FIG. 6B corresponding to a winter environmental condition. The double unit 1 conveniently has a larger horizontal dimension measuring about 2500 and a smaller horizontal dimension measuring about 1285 mm. By arranging the double units 1 with the larger dimension oriented transversely with respect to the deck P, and with the front loading side 2a of the frame 2 facing the rear (or front) end of the deck P itself, this may also in this case be entirely occupied width-wise. Also in this case, in the summer environmental condition the drawer-type cages 3 are arranged in the frame 2 with the closed lateral walls 6 facing inwards, while in the winter environmental condition the closed lateral walls 6 are arranged facing outwards. The position of the front loading side 2a of the frame 2 of the double unit 1, in this case orthogonal to the closed side 6 of the drawer-type cages 3, remains the same.

Obviously, the construction details and the embodiments of the transporting unit may be widely varied with respect to that described and illustrated, without departing from the scope of protection of the present invention as defined in the claims that follow.

The invention claimed is:

1. A method of transporting poultry, comprising:
   extracting a plurality of drawer-type cages from a supporting frame of a transporting unit;
   introducing poultry into said plurality of drawer-type cages;
   positioning said plurality of drawer-type cages, with poultry loaded in said drawer-type cages, in a stacked arrangement within said supporting frame such that a bottom wall of an upper drawer-type cage serves as a cover for an opening of another, underlying drawer-type cage; and
   positioning said transporting unit on a loading deck of a truck, wherein
   said drawer-type cages comprise a lateral wall substantially without aeration openings, and positioning said plurality of drawer-type cages within said supporting frame further comprises positioning said plurality of drawer-type cages with an orientation that is one of:
      (i) an orientation that exposes the poultry to a relatively greater aeration during transport; and
   wherein the orientation of said drawer-type cages within said supported frame is selected based on at least one of climate condition and atmospheric condition.

2. The method of transporting poultry according to claim 1, wherein:
   the climate and/or atmospheric conditions that form the basis for orientation of said drawer-type cages comprise: a summer climate, and a winter climate.

3. The method of transporting poultry according to claim 1, wherein:
   when transported in a summer climate and/or atmospheric condition, said drawer-type cages are oriented such that the loaded poultry will be exposed to a relatively greater aeration, and
   when transported in a winter climate and/or atmospheric condition, said drawer-type cages are oriented such that the loaded poultry will be exposed to a relatively lesser aeration.

4. The method of transporting poultry according to claim 3, wherein:
   a relatively greater aeration of the poultry, during transport in a summer climate, is achieved by orienting said drawer-type cages in said supporting frame and positioning said supporting frame on a loading deck of a truck such that said lateral walls substantially without aeration openings are positioned at an inward region of the loading deck of the truck, and
   a relatively lesser aeration of the poultry, during transport in a winter climate, is achieved by orienting said drawer-type cages in said support frame and positioning said supporting frame on a loading deck of a truck such that said lateral walls substantially without aeration openings are positioned along a periphery of the loading deck of the truck.

5. The method of transporting poultry according to claim 1, wherein
   positioning said plurality of drawer-type cages in a stacked arrangement includes arranging a plurality of said drawer-type cages into a stacked first pile and arranging a plurality of drawer-type cages into a stacked second pile.

6. The method of transporting poultry according to claim 5, wherein:
   the climate and/or atmospheric conditions that form the basis for orientation of said drawer-type cages comprise: a summer climate, and a winter climate.

7. The method of transporting poultry according to claim 5, wherein:
   when transported in a summer climate and/or atmospheric condition, said drawer-type cages are oriented such that the loaded poultry will be exposed to a relatively greater aeration, and
   when transported in a winter climate and/or atmospheric condition, said drawer-type cages are oriented such that the loaded poultry will be exposed to a relatively lesser aeration.

8. The method of transporting poultry according to claim 7, wherein:
   a relatively greater aeration of the poultry, during transport in a summer climate and/or atmospheric condition, is achieved by orienting said drawer-type cages in said supporting frame and positioning said supporting frame on a loading deck of a truck such that said lateral walls substantially without aeration openings are positioned at an inward region of the loading deck of the truck, and
   a relatively lesser aeration of the poultry, during transport in a winter climate and/or atmospheric condition, is achieved by orienting said drawer-type cages in said support frame and positioning said supporting frame on a loading deck of a truck such that said lateral walls substantially without aeration openings are positioned along a periphery of the loading deck of the truck.

9. The method of transporting poultry according to claim 8, wherein:
   when positioning said drawer-type cages such that said lateral walls substantially without aeration openings are positioned at an inward region of the loading deck of the truck, said lateral walls substantially without aeration openings of said drawer-type cages in said first pile are positioned adjacent to a common support structure to which said lateral walls substantially without aeration openings of said drawer-type cages in said second pile are positioned adjacent, and
   when positioning said drawer-type cages such that said lateral walls substantially without aeration openings are positioned along a periphery of the loading deck of the truck, said lateral walls substantially without aeration openings of said drawer-type cages in said first pile are positioned adjacent to a separate support structure from a support structure to which said lateral walls substantially without aeration openings of said drawer-type cages in said second pile are positioned adjacent.

10. The method of transporting poultry according to claim 5, wherein:
    positioning said transporting unit on a loading deck of a truck includes orienting said transporting unit on the loading deck such that a width of the transporting unit extends along a width of the loading deck in a manner whereby there will not remain sufficient space along the width of the loading deck adjacent to the transporting unit to allow for the positioning of a third pile of drawer-type cages.

11. The method of transporting poultry according to claim 7, wherein:

positioning said transporting unit on a loading deck of a truck includes orienting said transporting unit on the loading deck such that a horizontal width of said transporting unit occupies substantially the entire width of the loading deck.

\* \* \* \* \*